(12) United States Patent
Ding et al.

(10) Patent No.: US 9,767,090 B2
(45) Date of Patent: Sep. 19, 2017

(54) CORRECTING QUESTIONABLE LINE BREAKS AFTER AN OCR

(71) Applicant: TENCENT TECHNOLOGY (SHENZHEN) COMPANY LIMITED, Shenzhen (CN)

(72) Inventors: Rumin Ding, Shenzhen (CN); Juzhen Huo, Shenzhen (CN); Yixin Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/749,598

(22) Filed: Jun. 24, 2015

(65) Prior Publication Data

US 2015/0293898 A1    Oct. 15, 2015

Related U.S. Application Data

(63) Continuation of application No. PCT/CN2013/084284, filed on Sep. 26, 2013.

(30) Foreign Application Priority Data

Dec. 25, 2012   (CN) .......................... 2012-10572578

(51) Int. Cl.
*G06F 17/27* (2006.01)
*G06F 9/44* (2006.01)
(Continued)

(52) U.S. Cl.
CPC .............. *G06F 17/275* (2013.01); *G06F 3/00* (2013.01); *G06F 9/4448* (2013.01);
(Continued)

(58) Field of Classification Search
CPC .. G06F 17/211; G06F 17/277; G06F 17/2881; G06F 17/289; G06F 3/00; G06F 9/4448; G06F 17/275; G10L 15/005
See application file for complete search history.

(56) References Cited

U.S. PATENT DOCUMENTS

| 5,787,452 A | 7/1998 | McKenna |
| 2003/0014445 A1* | 1/2003 | Formanek ............. G06F 17/211 715/247 |

(Continued)

FOREIGN PATENT DOCUMENTS

| CN | 101140590 A | 3/2008 |
| CN | 102033915 A | 4/2011 |
| CN | 102541847 A | 7/2012 |

OTHER PUBLICATIONS

Stack Over Flow, Jul. 17, 2009, p. 2 http://stackoverflow.com/questions/1142802/how-to-use-localization-in-c-sharp/3#3.*
(Continued)

*Primary Examiner* — Cesar Paula
*Assistant Examiner* — Benjamin Norris
(74) *Attorney, Agent, or Firm* — Anova Law Group, PLLC

(57) ABSTRACT

Embodiments of the present invention provide a method and an apparatus for word detection in an application program. The method includes extracting a resource file from a multilingual application program installation package and converting the resource file into a text file. The method further includes disassembling the text file according to a language version to acquire a corresponding language text file; invoking a language detection tool according to the language version; and checking the language text file by using the language detection tool to identify questionable character information. The apparatus for word detection includes a file processing module, configured to extract a
(Continued)

resource file from a multilingual application program installation package, and convert the resource file into a text file; and a disassembling module, configured to disassemble the text file according to a language version to acquire a corresponding language text file. The apparatus further includes a tool invoking module, configured to invoke a language detection tool according to the language version; and a text detection module, configured to check the language text file by using the language detection tool to identify questionable character information. Word detection efficiency in an application program can be improved by adopting the present disclosure.

16 Claims, 6 Drawing Sheets

(51) Int. Cl.
    *G06F 17/28*     (2006.01)
    *G06F 3/00*     (2006.01)
    *G06F 17/21*     (2006.01)
(52) U.S. Cl.
    CPC .......... *G06F 17/211* (2013.01); *G06F 17/277* (2013.01); *G06F 17/289* (2013.01)

(56) References Cited

U.S. PATENT DOCUMENTS

| | | | | |
|---|---|---|---|---|
| 2006/0230346 A1* | 10/2006 | Bhogal | ............... | G06F 17/2735 715/205 |
| 2012/0173222 A1* | 7/2012 | Wang | .................... | G06F 17/273 704/2 |
| 2013/0111460 A1* | 5/2013 | Mohamed | ............. | G06F 9/4448 717/172 |

OTHER PUBLICATIONS

Android Developer, Jan. 11, 2010, pp. 1-6, https://web.archive.org/web/20100111030448/http://developer.android.com/guide/topics/resources/localization.html.*
The World Intellectual Property Organization (WIPO) International Search Report for PCT/CN2013/084284 dated Jan. 2, 2014.
The State Intellectual Property Office of the People's Republic of China (SIPO) Office Action 1 for 201210572578.5 dated Oct. 31, 2016 pp. 1-12.

* cited by examiner

CORRECTING QUESTIONABLE LINE BREAKS AFTER AN OCR

RELATED APPLICATION

This application claims priority to PCT Application No. PCT/CN2013/084284, filed on Sep. 26, 2013, which claims priority to Chinese Patent Application No. 201210572578.5, filed on Dec. 25, 2012 to the State Intellectual Property Office of the People's Republic of China, and entitled "METHOD AND APPARATUS FOR WORD DETECTION IN APPLICATION PROGRAM." The two priority applications are incorporated herein by reference.

FIELD OF THE TECHNOLOGY

The present disclosure relates to software debugging technologies, and in particular, to a method and an apparatus for word detection in an application program.

BACKGROUND OF THE DISCLOSURE

With the widespread use of various application programs, each application program is oriented to more types of users. Languages used by application program users are not limited to a single type of language, for example, Chinese. Instead, more users use various languages such as English and Malaysian. Therefore, in order to meet various requirements of different users, a multilingual application program provides various language versions according to choices of users is needed.

Accordingly, for word detection in an application program, words on an interactive interface should also be detected. Methods for word detection in an application program include detection by switching between different language versions and manual detection by extracting a resource file of a multilingual application program. During a process of performing detection by switching between different language versions, a multilingual application program is first installed in a terminal device. By switching between different language versions, words on all interactive interfaces in the language versions are checked. However, this type of word detection cannot ensure that all interactive interfaces in each language version are traversed and checked, and the detection process needs to perform in cooperation with an operation of the multilingual application program, which may cause low efficiency.

The process of performing manual detection by extracting a resource file is often in the charge of specialists of different languages. For example, an application program of an English version should be checked by a person specialized in English, and an application program of a Hindi version should be checked by a person specialized in Hindi. This may further slowdown the word detection process.

SUMMARY

In view of this, in order to solve a problem of low detection efficiency, embodiments of the present disclosure provide a method and apparatus for word detection in an application program that can improve the system efficiency.

One aspect of the present disclosure provides a method for word detection in an application program. The method includes extracting a resource file from a multilingual application program installation package, and converting the resource file into a text file; disassembling the text file according to a language version to acquire a corresponding language text file; invoking a language detection tool according to the language version; and checking the language text file by using the language detection tool to acquire questionable character information.

Another aspect of the present disclosure provides a method for word detection in an application program. The apparatus for word detection in an application program includes a file processing module, configured to extract a resource file from a multilingual application program installation package, and convert the resource file into a text file; a disassembling module, configured to disassemble the text file according to a language version to acquire a corresponding language text file; a tool invoking module, configured to invoke a language detection tool according to the language version; and a text detection module, configured to check the language text file by using the language detection tool to identify questionable character information.

According to the foregoing method and apparatus for word detection in an application program, a resource file is extracted; the extracted resource file is automatically converted into a text file suitable for the detection. The text file is further disassembled into corresponding language text files according to different language versions, and correctness of the language text files corresponding to the language versions is checked one by one. Accordingly, word detection can be completed without the cooperation of an operation of a multilingual application program and manual detection by specialists, thereby greatly improving efficiency.

DESCRIPTION OF EMBODIMENTS

Figure 1:
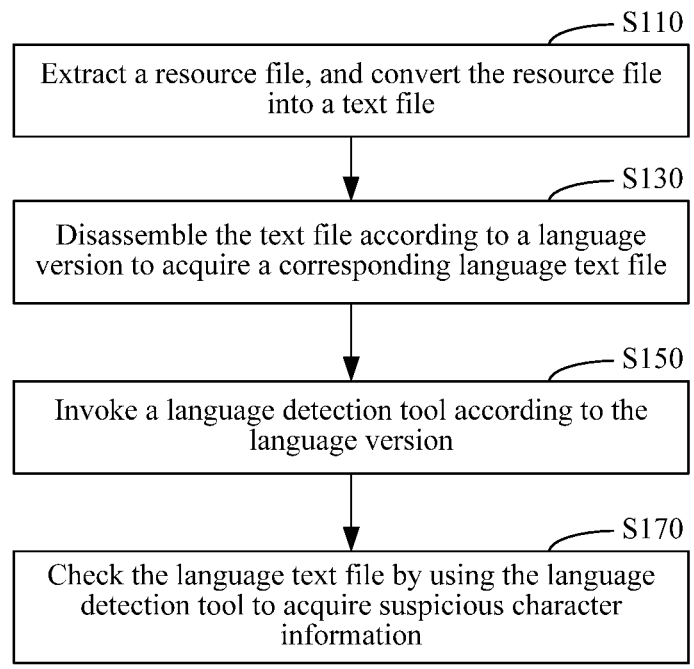
FIG. 1 is a flowchart of a method for word detection in an application program according to an embodiment.

As shown in FIG. 1, in an embodiment, a method for word detection in an application program includes the following steps.

Step S110: Extract a resource file from a multilingual application program installation package, and convert the resource file into a text file.

In this embodiment, the resource file is used to provide users with various interactive interfaces and words and images on the interactive interfaces in the application program with no need to edit code. The resource file includes bitmaps, characters and other data corresponding to an interactive interface. Each application program corresponds to a resource file, and corresponding characters of a provided language versions are stored in the resource file according to the language versions.

The resource file is extracted from the multilingual application program installation package of the application program. The extracted resource file is converted into a text format to acquire the text file corresponding to the resource file to facilitate detection of a character in the resource file.

Specifically, the multilingual application program installation package of the application program is an executable file that runs on a terminal device and can be used for installing the application program. For example, in an Android operating system of a mobile terminal, a multilingual application program installation package of an application program is a file with a suffix .apk.

Step S130: Disassemble the text file according to a language version to acquire a corresponding language text file.

In this embodiment, the resource file provides an interactive interface of at least one language version for the application program running on a mobile terminal, and in the text file of the resource file, characters are stored in order according to a corresponding language version; for example, every column of the text file corresponds to a language version. The text file is disassembled according to a language version to acquire a language text file corresponding to each language version, so that the text file including multilingual characters is divided into multiple text files including monolingual characters, that is, the language text file corresponding to each language version.

Figure 2:
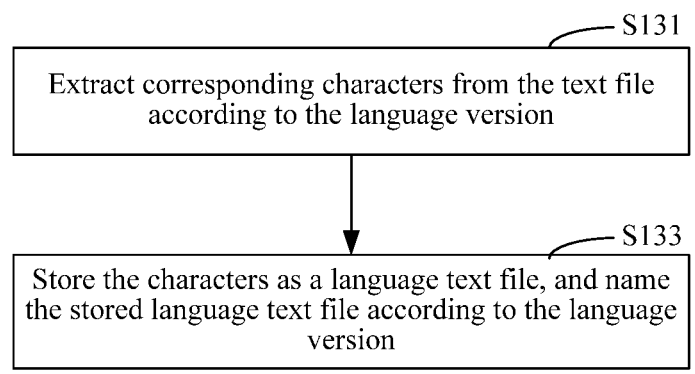
FIG. 2 is a flowchart of a method for disassembling a text file according to a language version to acquire a corresponding language text file in FIG. 1.

As shown in FIG. 2, in an embodiment, a specific process of step S130 is:

Step S131: Extract corresponding characters from the text file according to the language version.

In this embodiment, characters corresponding to a language version are extracted from the text file according to the language version one by one.

Step S133: Store the characters as a language text file, and name the stored language text file according to the language version.

In this embodiment, the characters extracted according to the language version are stored in a text format to acquire the language text file corresponding to the language version, and a language name corresponding to the language version is used as a file name of the language text file.

Step S150: Invoke a language detection tool according to the language version.

In this embodiment, to test whether words on an interactive interface of the application program is correct, characters in a language text file of each language version should be checked one by one, so as to judge correctness of the characters used for forming the interactive interface word in the language text file.

The language detection tool is used for word detection. Different language detection tools correspond to different language versions, and check a file in a text format. A language type of the language text file is acquired according to the language version, and the language detection tool corresponding to the language type is further invoked. Word detection performed by the language detection tool includes spelling detection and grammar detection, but the present disclosure is not limited thereto.

In an example, the language detection tool is provided with a corresponding word library that records correct characters, that is, a dictionary. When comparing the language text file with the dictionary, the language detection tool determines that characters in the language text file are correct if the characters in the language text file are the same as characters recorded in the dictionary. The language detection tool determines that a character in the language text file is a questionable character if the character in the language text file is not the same as a character recorded in the dictionary.

Step S170: Check the language text file by using the language detection tool to identify questionable character information.

In this embodiment, the characters in the language text file are checked by using the language detection tool to acquire the questionable character information. The questionable character information includes information such as a questionable character, a location of the questionable character and modification advice, and the questionable character information acquired from the language text file is displayed in a form of a list.

Figure 3:
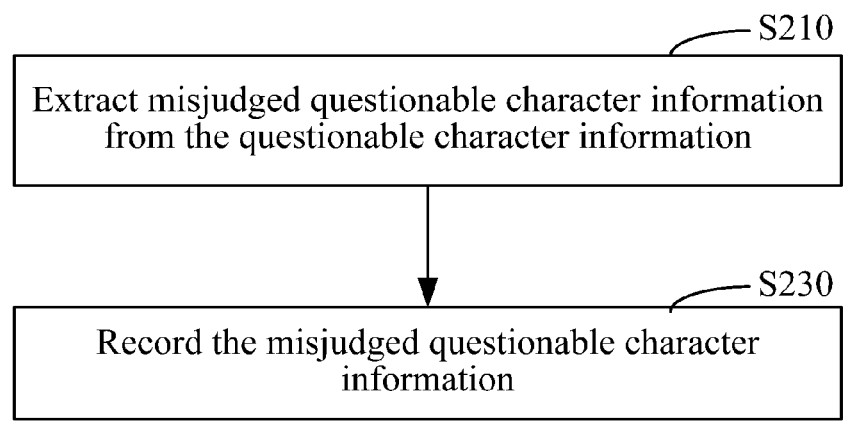
FIG. 3 is a flowchart of a method for word detection in an application program according to another embodiment.

As shown in FIG. 3, in another embodiment, the foregoing method for word detection in an application program further includes the following steps.

Step S210: Extract misjudged questionable character information from the questionable character information.

In this embodiment, the questionable character information detected by using the language detection tool may include questionable character information that is actually correct, that is, misjudged character information. Therefore, the acquired questionable character information further needs to be screened to extract the misjudged questionable character information.

Figure 4:
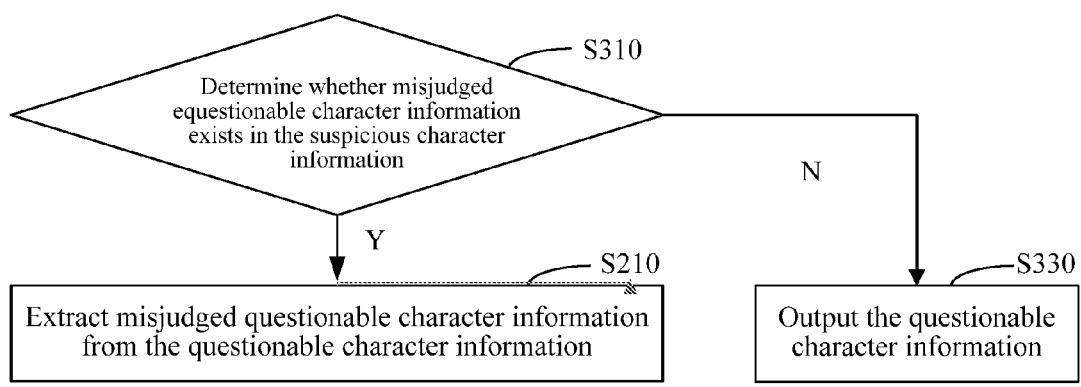
FIG. 4 is a flowchart of a method for word detection in an application program according to another embodiment.

As shown in FIG. 4, in another embodiment, before step S210, the method further includes the following steps.

Step S310: Judge whether misjudged questionable character information exists in the questionable character information; and enter step S210 if misjudged questionable character information exists in the questionable character information; or enter step S330 if no misjudged questionable character information exists in the questionable character information.

In this embodiment, the misjudged questionable character information acquired through artificial screening is obtained. Whether the questionable character information detected by using the language detection tool is misjudged is determined according to the misjudged questionable character information. If the questionable character information detected by using the language detection tool is misjudged, the misjudged questionable character information is extracted. If the questionable character information detected by using the language detection tool is not misjudged, the questionable character information detected by using the language detection tool is outputted directly, to facilitate correction of the characters in the language text file.

Step S330: Output the questionable character information.

Step S230: Record the misjudged questionable character information.

In an embodiment, the foregoing method for word detection in an application program further includes a step of removing misjudged questionable character information from the detected questionable character information according to the recorded misjudged questionable character information.

In this embodiment, after the language text file is checked and the misjudged questionable character information in the language text file is recorded, detection is performed again according to a recorded misjudged questionable character to remove misjudged questionable character information from the questionable character information, and acquire a more accurate word detection result.

For instance, in an example in which a dictionary is adopted, misjudged questionable character information is recorded in the dictionary. Then, detection is performed again by using the updated dictionary to remove misjudged questionable character information from the questionable character information, and acquire a more accurate word detection result.

Figure 5:
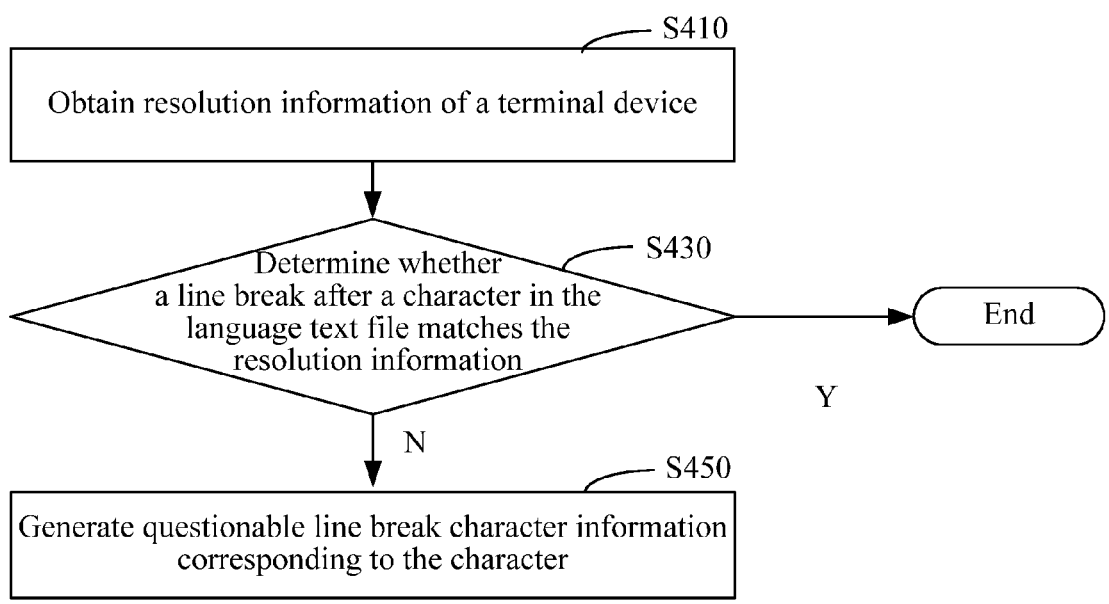
FIG. 5 is a flowchart of a method for checking a language text file according to another embodiment.

As shown in FIG. 5, in another embodiment, the method for word detection in an application program further includes.

Step S410: Obtain resolution information of a terminal device.

In this embodiment, the resolution information of a screen of the terminal device running the application program is obtained. The resolution information is used for measuring a quantity of words displayed in each row or column of the screen of the terminal device by a horizontal and vertical pixel.

Step S430: Determine whether a line break after a character in the language text file matches the resolution information, and enter step 450 if the line break after the character in the language text file does not match the resolution information. End if the line break after the character in the language text file matches the resolution information.

In this embodiment, a specific process for determining whether a line break after a character in the language text file matches the resolution information is as follows. The process includes acquiring a corresponding language type and obtaining a displaying word size of an interactive interface of the application program according to the language text file; and calculating, according to the language type and the displaying word size, a width taken up by characters. The width is represented by a pixel. The process further includes calculating a quantity of pixel points included in each row of the screen of the terminal device according to the resolution information; dividing the quantity of pixel points included in each row by the width, to acquire a quantity of words included in each row; and determining whether a line break after a character in the language text file is correct according to the quantity of words included in each row. If the line break after the character in the language text file is not correct, the process includes generating corresponding questionable line break character information to identify the character before the wrong line break by using the questionable line break character information.

In step S430, the character before the wrong line break may also be recognized by determining whether a pixel value of a character length in each row of the language text file matches a quantity of pixel points included in the same row of the screen. If it is determined that a pixel value of a character length in a row is greater than a quantity of pixel points included in the same row of the screen, it indicates that a wrong line break occurs.

Step S450: Generate questionable line break character information corresponding to the character.

In this embodiment, the questionable line break character information includes information such as the character before the wrong line break, a location of the character and modification advice.

Figure 6:
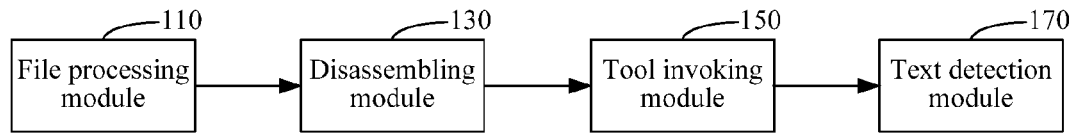
FIG. 6 is a schematic structural diagram of an apparatus for word detection in an application program according to an embodiment.

As shown in FIG. 6, in an embodiment, an apparatus for word detection in an application program includes a file processing module 110, a disassembling module 130, a tool invoking module 150, and a text detection module 170.

The file processing module 110 is configured to extract a resource file from a multilingual application program installation package, and convert the resource file into a text file.

In this embodiment, the resource file is used to provide users with various interactive interfaces and words and images on the interactive interfaces in the application program with no need to edit code. The resource file includes bitmaps, characters and other data corresponding to an interactive interface. Each application program corresponds to a resource file, and corresponding characters of a provided language version are stored in the resource file according to the language version.

The file processing module 110 extracts the resource file from the multilingual application program installation package of the application program, and converts the extracted resource file into a text format to acquire the text file corresponding to the resource file to facilitate detection of a character in the resource file.

Specifically, the multilingual application program installation package of the application program is an executable file that runs on a terminal device and can be used for installing the application program. For example, in an Android operating system of a mobile terminal, a multilingual application program installation package of an application program is a file with a suffix .apk.

The disassembling module 130 is configured to disassemble the text file according to a language version to acquire a corresponding language text file.

In this embodiment, the resource file provides an interactive interface of at least one language version for the application program running on a mobile terminal, and in the text file of the resource file, characters are stored in order according to a corresponding language version; for example, every column of the text file corresponds to a language version. The disassembling module 130 disassembles the text file according to a language version to acquire a language text file corresponding to each language version, so that the text file including multilingual characters is divided into multiple text files including monolingual characters, that is, the language text file corresponding to each language version.

Figure 7:
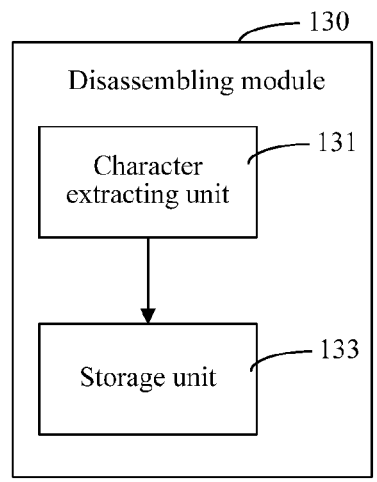
FIG. 7 is a schematic structural diagram of a disassembling module in FIG. 6.

As shown in FIG. 7, in an embodiment, the disassembling module 130 includes a character extracting unit 131 and a storage unit 133.

The character extracting unit 131 is configured to extract corresponding characters from the text file according to the language version.

In this embodiment, the character extracting unit 131 extracts characters corresponding to a language version from the text file according to the language version one by one.

The storage unit 133 is configured to store the characters as a language text file, and name the stored language text file according to the language version.

In this embodiment, the storage unit 133 stores the character extracted according to the language version in a text format to acquire the language text file corresponding to the language version, and uses a language name corresponding to the language version as a file name of the language text file.

The tool invoking module 150 is configured to invoke a language detection tool according to the language version.

In this embodiment, to test whether words on an interactive interface of the application program is correct, characters in a language text file of each language version should be checked one by one, so as to judge correctness of the characters used for forming the interactive interface word in the language text file.

The language detection tool is used for word detection. Different language detection tools correspond to different language versions, and check a file in a text format. The tool invoking module 150 acquires a language type of the language text file according to the language version, and further invokes the language detection tool corresponding to the language type. Word detection performed by the language detection tool includes spelling detection and grammar detection, but the present disclosure is not limited thereto.

The text detection module 170 is configured to check the language text file by using the language detection tool to identify questionable character information.

In this embodiment, the text detection module 170 checks the characters in the language text file by using the language detection tool to acquire the questionable character information. The questionable character information includes information such as a questionable character, a location of the questionable character and modification advice, and the questionable character information acquired from the language text file is displayed in a form of a list.

In an example, the language detection tool is provided with a corresponding word library that records correct characters, that is, a dictionary. When comparing the language text file with the dictionary, the language detection tool determines that characters in the language text file are correct if the characters in the language text file are the same as characters recorded in the dictionary. The detection tool determines that a character in the language text file is a questionable character if the character in the language text file is not the same as a character recorded in the dictionary.

Figure 8:
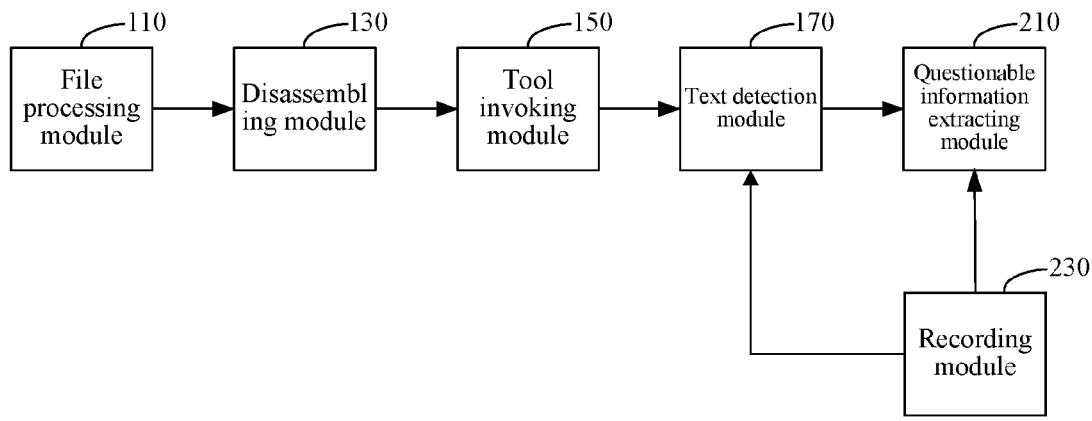
FIG. 8 is a schematic structural diagram of an apparatus for word detection in an application program according to another embodiment.

As shown in FIG. 8, in another embodiment, the apparatus for word detection in an application program further includes a misjudged information extracting module 210 and a recording module 230.

The misjudged information extracting module 210 is configured to extract misjudged questionable character information from the questionable character information;

In this embodiment, the questionable character information detected by using a language detection tool may include questionable character information that is actually correct, that is, misjudged character information. Therefore, the misjudged information extracting module 210 further needs to screen the acquired questionable character information to extract the misjudged questionable character information.

In another embodiment, the apparatus for word detection in an application program further includes a misjudged information recognizing module, where the misjudged information recognizing module is configured to judge whether misjudged questionable character information exists in questionable character information, and inform the misjudged information extracting module 210 if misjudged questionable character information exists in the questionable character information, or output the questionable character information if no misjudged questionable character information exists in the questionable character information In this embodiment, the misjudged information recognizing module obtains the misjudged questionable character information acquired through artificial screening, and judges, according to the misjudged questionable character information, whether the questionable character information detected by using the language detection tool is misjudged. The misjudged information recognizing module further extracts the misjudged questionable character information if the questionable character information detected by using the language detection tool is misjudged. The misjudged information recognizing module further directly outputs the questionable character information detected by using the language detection tool if the questionable character information detected by using the language detection tool is not misjudged to facilitate correction of the characters in the language text file.

The recording module 230 is configured to record the misjudged questionable character information.

The text detection module 170 is further configured to remove misjudged questionable character information from the detected questionable character information according to the recorded misjudged questionable character information.

In this embodiment, after the language text file is checked and the misjudged questionable character information in the language text file is recorded, the text detection module 170 performs detection again according to a recorded misjudged questionable character to remove misjudged questionable character information from the questionable character information, and acquire a more accurate word detection result.

For instance, in an example in which a dictionary is adopted, misjudged questionable character information is recorded in the dictionary. Then, detection is performed again by using the updated dictionary to remove misjudged questionable character information from the questionable character information, and acquire a more accurate word detection result.

Figure 9:
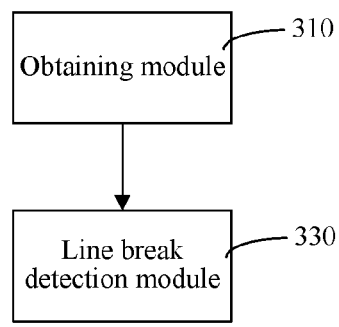
FIG. 9 is a schematic structural diagram of a detection module according to another embodiment.

As shown in FIG. 9, in another embodiment, the apparatus for word detection in an application program further includes an obtaining module 310 and a line break detection module 330.

The obtaining module 310 is configured to obtain resolution information of a terminal device.

In this embodiment, the obtaining module 310 obtains the resolution information of a screen of the terminal device running the application program. The resolution information is used for measuring a quantity of words displayed in each row or column of the screen of the terminal device by a horizontal and vertical pixel.

The line break detection module 330 is configured to judge whether a line break after a character in the language text file matches the resolution information, and generate questionable line break character information corresponding to the character if the line break after the character in the language text file does not match the resolution information. The line break detection module 330 is configured to stop execution if the line break after the character in the language text file matches the resolution information.

In this embodiment, the line break detection module 330 acquires a corresponding language type and obtains a displaying word size of an interactive interface of the application program according to the language text file. The line break detection module 330 calculates, according to the language type and the displaying word size, a width taken up by characters, where the width is represented by a pixel; and calculates a quantity of pixel points included in each row of the screen of the terminal device according to the resolution information. The line break detection module 330 divides the quantity of pixel points included in each row by the width, to acquire a quantity of words included in each row; determines whether a line break after a character in the language text file is correct according to the quantity of words included in each row. The line break detection module 330 generates corresponding questionable line break character information if the line break after the character in the language text file is not correct to identify the character before the wrong line break by using the questionable line break character information.

In addition, the line break detection module 330 may also recognize the character before the wrong line break by determining whether a pixel value of a character length in each row of the language text file matches a quantity of pixel points included in the same row of the screen. If it is determined that a pixel value of a character length in a row is greater than a quantity of pixel points included in the same row of the screen, it indicates that a wrong line break occurs. The questionable line break character information includes information such as the character before the wrong line break, a location of the character and modification advice.

Figure 10:
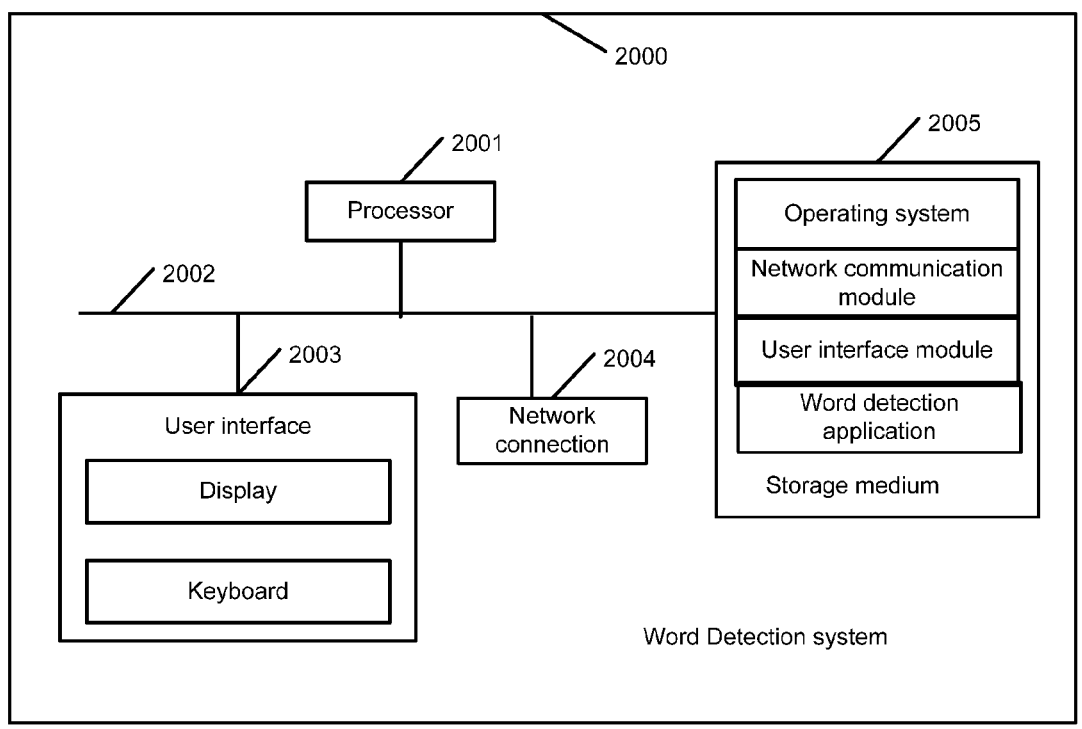
FIG. 10 is another block diagram of an exemplary word detection system consistent with the present disclosure.

FIG. 10 is another schematic diagram of a webpage information presentation system 2000 consistent with the present disclosure. As shown in FIG. 10, the word detection system 2000 may include a processor 2001, such as a CPU, a network connection 2004, a user interface 2003, storage medium 2005, and a bus 2002. Processor 2001 may include any appropriate processor or processors. Further, processor 2001 can include multiple cores for multi-thread or parallel processing. Storage medium 2005 may include memory modules, such as Read-only Memory (ROM), Random Access Memory (RAM), flash memory modules, and erasable and rewritable memory, and mass storages, such as CD-ROM, U-disk, and hard disk, etc. Storage medium 2005 may store computer programs for implementing various processes, when executed by processor 2001, including the operating system, communication program modules, and other application modules used to implement the system for presenting webpage information consistent with the present disclosure. The network connection 2004 may connect to any appropriate type of communication networks, including the Internet, LAN (Local Area Network), or other types of computer networks or telecommunication networks, either wired or wireless. For example, the network connection 1004 may connect the online word detection system to other language systems, so that a user may complete transactions seamlessly.

Figure 11:
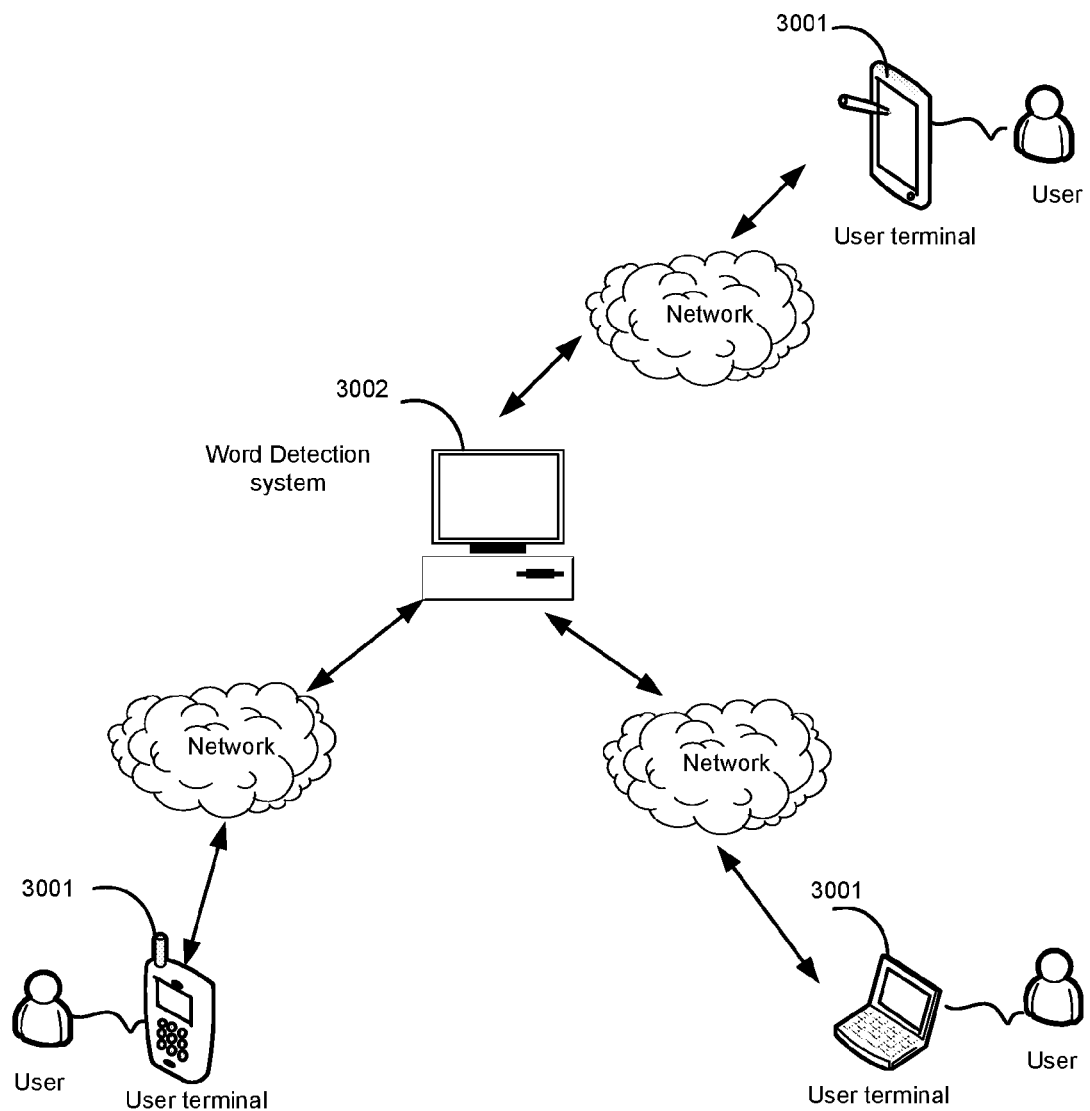
FIG. 11 is an exemplary system for conducting word detection consistent with the present disclosure.

In FIG. 11, the network connection 2004 may be used to connect the word detection system 2000 and the user terminal 1000. The network connection 2004 may transfer data between the word detection system 2000 and the user terminal 1000. The user interface 2003 may be used to allow user to enter input, through a display or a keyboard. The word detection system 2000 may obtain user input data through user interface 2003. In addition, the processor 2001 may execute the application programs stored in the storage medium 2005 to implement word and language detection functions.

In one embodiment, the word detection system 2000 may receive user log-in information or user account information from the user terminal. The user registration information includes a contact person's name, telephone number, address, etc. In one embodiment, the processor 2001 may execute the steps described above in FIGS. 1-9 and manage the word detection process.

Consistent with embodiments of the present disclosure, one or more non-transitory storage medium storing a computer program are provided to implement the system and method for language and word detection. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

According to the foregoing method and apparatus for word detection in an application program, a resource file is extracted; the extracted resource file is automatically converted into a text file suitable for the detection. The text file is further disassembled into corresponding language text files according to different language versions, and correctness of the language text files corresponding to the language versions is checked one by one. In this way, word detection can be completed without a multilingual application program and manual detection by language specialists, thereby greatly improve the efficiency of the process.

The foregoing embodiments only describe several implementation manners of the present disclosure, and the description is specific and detailed, but cannot be understood as a limitation on the patent scope of the present disclosure. It should be noted that a person of ordinary skill in the art may further make variations and improvements without departing from the conception of the present disclosure, and these variations and improvements all fall within the protection scope of the present disclosure. Therefore, the patent protection scope of the present disclosure should be subject to the appended claims.

What is claimed is:

1. A method for word detection in an application program, comprising:
    extracting a resource file from a multilingual application program installation package, and converting the resource file into a text file;
    disassembling the text file according to a language version to acquire a corresponding language text file;
    invoking a language detection tool according to the language version; and
    checking the language text file by using the language detection tool to identify questionable character information;
    wherein the method further comprises:
    obtaining resolution information of a terminal device;
    determining whether a line break after a character in the language text file matches the resolution information; and
    generating questionable line break character information corresponding to the character when it is determined that the line break after the character in the language text file does not match the resolution information, wherein the questionable line break character information includes a character before a wrong line break, a location of the character, and modification advice; and the questionable line break character information is displayed in form of a list.

2. The method for word detection in an application program according to claim 1, wherein steps of the disassembling the text file according to a language version to acquire a corresponding language text file include:
    extracting corresponding characters from the text file according to the language version;
    automatically storing the characters as a language text file; and
    automatically naming the stored language text file according to the language version.

3. The method for word detection in an application program according to claim 1, further comprising:
   extracting misjudged questionable character information from the questionable character information;
   recording the misjudged questionable character information; and
   removing misjudged questionable character information from the detected questionable character information according to the recorded misjudged questionable character information.

4. The method for word detection in an application program according to claim 3, before the step of extracting misjudged questionable character information from the questionable character information, further comprising:
   determining whether misjudged questionable character information exists in the questionable character information; and extracting misjudged questionable character information from the questionable character information if misjudged questionable character information exists in the questionable character information; or
   outputting the questionable character information if no misjudged questionable character information exists in the questionable character information.

5. An apparatus for word detection in an application program, comprising:
   one or more processors configured to execute:
   a file processing module, configured to extract a resource file from a multilingual application program installation package, and convert the resource file into a text file;
   a disassembling module, configured to disassemble the text file according to a language version to acquire a corresponding language text file;
   a tool invoking module, configured to invoke a language detection tool according to the language version; and
   a text detection module, configured to check the language text file by using the language detection tool to identify questionable character information;
   wherein the apparatus further comprises:
   an obtaining module, configured to obtain resolution information of a terminal device; and
   a line break detection module, configured to determine whether a line break after a character in the language text file matches the resolution information, and to generate questionable line break character information corresponding to the character when it is determined that the line break after the character in the language text file does not match the resolution information, wherein the questionable line break character information includes a character before a wrong line break, a location of the character, and modification advice; and the questionable line break character information is displayed in form of a list.

6. The apparatus for word detection in an application program according to claim 5, wherein the disassembling module comprises:
   a character extracting unit, configured to extract corresponding characters from the text file according to the language version; and
   a storage unit, configured to automatically store the characters as a language text file, and automatically name the stored language text file according to the language version.

7. The apparatus for word detection in an application program according to claim 5, wherein the one or more processors are further configured to execute:
   a misjudged information extracting module, configured to extract misjudged questionable character information from the questionable character information; and
   a recording module, configured to record the misjudged questionable character information; wherein the text detection module is further configured to remove misjudged questionable character information from the detected questionable character information according to the recorded misjudged questionable character information.

8. The apparatus for word detection in an application program according to claim 7, wherein the one or more processors are further configured to execute:
   a misjudged information recognizing module, configured to judge whether misjudged questionable character information exists in the questionable character information, and inform the misjudged information extracting module if misjudged questionable character information exists in the questionable character information, or output the questionable character information if no misjudged questionable character information exists in the questionable character information.

9. The method according to claim 1, wherein determining whether a line break after a character in the language text file matches the resolution information further comprises:
   obtaining a language type of the language text file,
   obtaining a displaying word size of an interactive interface of the application program according to the language text file,
   calculating, according to the language type and the displaying word size, a width taken up by a character, the width being represented in units of pixels;
   calculating a quantity of pixel points included in each row of a screen of the terminal device according to the resolution information;
   dividing the quantity of pixel points included in each row by the width, to acquire a quantity of characters included in each row; and
   determining whether a line break after a character in the language text file is correct according to the quantity of characters included in each row.

10. The method according to claim 1, wherein determining whether a line break after a character in the language text file matches the resolution information further comprises:
   determining whether a pixel value of a character length in each row of the language text file matches a quantity of pixel points included in the same row of a screen of the terminal device, wherein the quantity of pixel points included in the same row of the screen is obtained according to the resolution information; and
   when it is determined that the pixel value of the character length in one row is greater than the quantity of pixel points included in the same row of the screen, determining that the line break of the one row does not match the resolution information.

11. A non-transitory computer readable storage medium containing computer-executable program for, when being executed by a processor, performing a method for word detection in an application program, the method comprising:
   extracting a resource file from a multilingual application program installation package, and converting the resource file into a text file;
   disassembling the text file according to a language version to acquire a corresponding language text file;
   invoking a language detection tool according to the language version; and checking the language text file by using the language detection tool to identify questionable character information;

wherein the method further comprises:

obtaining resolution information of a terminal device;

determining whether a line break after a character in the language text file matches the resolution information; and generating questionable line break character information corresponding to the character when it is determined that the line break after the character in the language text file does not match the resolution information, wherein the questionable line break character information includes a character before a wrong line break, a location of the character, and modification advice; and the questionable line break character information is displayed in form of a list.

12. The non-transitory computer readable storage medium according to claim 11, the method further comprising:

obtaining resolution information of a terminal device; and determining whether a line break after a character in the language text file matches the resolution information, and generating questionable line break character information corresponding to the character if the line break after the character in the language text file does not match the resolution information.

13. The non-transitory computer readable storage medium according to claim 11, the method further comprising:

extracting misjudged questionable character information from the questionable character information;

recording the misjudged questionable character information; and removing misjudged questionable character information from the detected questionable character information according to the recorded misjudged questionable character information.

14. The non-transitory computer readable storage medium according to claim 13, before the step of extracting misjudged questionable character information from the questionable character information, the method further comprising:

determining whether misjudged questionable character information exists in the questionable character information; and extracting misjudged questionable character information from the questionable character information if misjudged questionable character information exists in the questionable character information; or outputting the questionable character information if no misjudged questionable character information exists in the questionable character information.

15. The non-transitory computer readable storage medium according to claim 11, wherein determining whether a line break after a character in the language text file matches the resolution information further comprises:

obtaining a language type of the language text file, obtaining a displaying word size of an interactive interface of the application program according to the language text file, calculating, according to the language type and the displaying word size, a width taken up by a character, the width being represented in units of pixels;

calculating a quantity of pixel points included in each row of a screen of the terminal device according to the resolution information;

dividing the quantity of pixel points included in each row by the width, to acquire a quantity of characters included in each row; and determining whether a line break after a character in the language text file is correct according to the quantity of characters included in each row.

16. The non-transitory computer readable storage medium according to claim 11, wherein determining whether a line break after a character in the language text file matches the resolution information further comprises:

determining whether a pixel value of a character length in each row of the language text file matches a quantity of pixel points included in the same row of a screen of the terminal device, wherein the quantity of pixel points included in the same row of the screen is obtained according to the resolution information; and when it is determined that the pixel value of the character length in one row is greater than the quantity of pixel points included in the same row of the screen, determining that the line break of the one row does not match the resolution information.

* * * * *